United States Patent
Nakamura et al.

(10) Patent No.: US 10,992,191 B2
(45) Date of Patent: Apr. 27, 2021

(54) ROTATING ELECTRICAL MACHINE

(71) Applicant: MITSUBISHI ELECTRIC CORPORATION, Tokyo (JP)

(72) Inventors: Masashi Nakamura, Tokyo (JP); Akihito Mori, Tokyo (JP); Tatsuro Hino, Tokyo (JP); Kohei Yasuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 24 days.

(21) Appl. No.: 16/260,436

(22) Filed: Jan. 29, 2019

(65) Prior Publication Data
US 2019/0356180 A1 Nov. 21, 2019

(30) Foreign Application Priority Data

May 15, 2018 (JP) .............................. JP2018-093599

(51) Int. Cl.
*H02K 1/16* (2006.01)
*H02K 15/02* (2006.01)

(52) U.S. Cl.
CPC ........... *H02K 1/165* (2013.01); *H02K 15/024* (2013.01)

(58) Field of Classification Search
CPC .. H02K 1/00; H02K 1/14; H02K 1/16; H02K 1/165; H02K 1/18; H02K 15/00; H02K 15/02; H02K 15/024
See application file for complete search history.

(56) References Cited

U.S. PATENT DOCUMENTS

| | | | |
|---|---|---|---|
| 3,643,117 A | * | 2/1972 | Alger ..................... H02K 33/04 310/17 |
| 2002/0093270 A1 | * | 7/2002 | Oohashi .................. H02K 3/24 310/254.1 |

(Continued)

FOREIGN PATENT DOCUMENTS

| | | |
|---|---|---|
| CN | 101171733 A | 4/2008 |
| CN | 104901442 A | 9/2015 |

(Continued)

OTHER PUBLICATIONS

Communication dated Aug. 6, 2019, from the Japanese Patent Office in counterpart application No. 2018-093599.

(Continued)

*Primary Examiner* — Tran N Nguyen
(74) *Attorney, Agent, or Firm* — Sughrue Mion, PLLC; Richard C. Turner

(57) ABSTRACT

A rotating electrical machine can increase the strength of divided cores and, in addition, can achieve both a reduction in iron loss and a high rigidity of the divided cores. The stator of the rotating electrical machine includes a stator core having radially divided cores arranged in a ring, each divided core being a laminate of magnetic steel sheets. Each divided core has a swaged portion in which the laminated magnetic steel sheets are bonded by swaging. The swaged portion is disposed in a core back portion, which is in contact with core back portions of divided cores located on both sides of the divided core at a position whose distance from an outer periphery of the core back portion is within ⅓ of a radial length of the core back portion.

18 Claims, 11 Drawing Sheets

(56) References Cited

U.S. PATENT DOCUMENTS

| | | | | |
|---|---|---|---|---|
| 2002/0145359 A1* | 10/2002 | Nishiyama | ........ | F04C 29/0085 |
| | | | | 310/216.065 |
| 2009/0066183 A1 | 3/2009 | Aramaki et al. | | |
| 2012/0228987 A1* | 9/2012 | Goto | ............. | H02K 1/148 |
| | | | | 310/216.009 |
| 2015/0256036 A1* | 9/2015 | Nakamura | ........... | H01F 41/024 |
| | | | | 310/216.048 |
| 2015/0256037 A1 | 9/2015 | Kudose et al. | | |
| 2019/0081521 A1 | 3/2019 | Baba et al. | | |

FOREIGN PATENT DOCUMENTS

| | | | | | |
|---|---|---|---|---|---|
| JP | 2006158003 | * | 6/2006 | ............. | H02K 1/18 |
| JP | 201020707 | * | 9/2010 | ............. | H02K 1/22 |
| JP | 2012170261 | * | 9/2012 | | |
| JP | 2012-222836 A | | 11/2012 | | |
| JP | 2013-219947 A | | 10/2013 | | |
| JP | 5819037 B2 | | 11/2015 | | |
| JP | 2017005785 | * | 1/2017 | ............. | H02K 1/18 |
| WO | 2017/208293 A1 | | 12/2017 | | |

OTHER PUBLICATIONS

Office Action dated Oct. 10, 2020, from the China National Intellectual Property Administration in Application No. 201910363141.2.

\* cited by examiner

ROTATING ELECTRICAL MACHINE

TECHNICAL FIELD

The present application relates to the field of a rotating electrical machine, and more particularly to the field of a stator structure of a rotating electrical machine.

BACKGROUND ART

These days in EVs (Electric Vehicles), PHEVs (Plug-in Hybrid Electric Vehicles) and HEVs (Hybrid Electric Vehicles), there is a demand for enhancement of electricity cost in a wide range from a low load region (city driving) to a high load region (uphill driving, and freeway driving). Further, in rotating electrical machines used to drive vehicles, there is a demand for downsizing, higher efficiency, quietness and increased power density of the motors in a wide rotational range. In particular, the efficiency of a motor in a frequently-used low load region is known to greatly affect the electricity cost.

In view of such a situation, rotating electrical machines, such as electric motors and generators, for use in vehicles use a permanent magnet in order to increase the power density per stator volume. A well-known stator core for use in a rotating electrical machine therefore has the structure of a laminate of iron cores which are magnetic members. The use of such a stator core can reduce the generation of an eddy current in the iron cores, thereby enhancing the efficiency of the motor.

Further, a divided core structure is commonly known in which an iron core is divided, and the outer periphery of the divided cores is annularly fixed by a frame. The use of such a structure can increase the productivity. In addition, the use of such divided cores increases the occupancy of coils and the power density, and can thereby obtain advantages such as enhanced efficiency, reduced mold cost and higher-speed stator windings (see, for example, patent document 1).

CITATION LIST

Patent Literature (Patent document 1) Japanese Patent No. 5819037

In general, in the case of using a stator core having a divided core structure, laminated magnetic steel sheets are fastened together by punch swaging from the viewpoint of increasing the productivity. However, when the core rigidity is low, stress will be concentrated in contact portions between divided cores upon thermal fitting or press fitting of a frame, resulting in deformation of the magnetic steel sheets. Consequently, peeling, buckling, etc. of the magnetic steel sheets may occur, leading to deterioration in the magnetic properties and decrease in the shape retention of the stator. Further, if the magnetic steel sheets are made thinner to reduce iron loss, the core rigidity decreases and deformation of the magnetic steel sheets is more likely to occur.

In view of this, a method for increasing the core strength has been proposed which involves increasing the number of swaged portions, which fasten the magnetic steel sheets of a divided core, and disposing some swaged portions in a central portion of the core, as described in patent document 1. This method, however, entails an increase in iron loss due to swaging loss, resulting in a decrease in the motor efficiency. This makes against increase in the power density, downsizing of the motor, and enhancement of the electricity cost.

SUMMARY OF THE INVENTION

The present application has been made to solve the above problem and an object of the present application is to provide a rotating electrical machine which can increase the strength of divided cores and, in addition, can achieve both a reduction in iron loss and a high rigidity of the divided cores.

A rotating electrical machine disclosed in the present application includes a housing; a stator fixed in the housing; and a rotor disposed inside and opposite the stator. The stator includes a stator core having radially divided cores arranged in a ring, each divided core being a laminate of magnetic steel sheets, and stator windings placed in slots each formed by two adjacent ones of the divided cores of the stator core. Each divided core has at least one swaged portion in which the laminated magnetic steel sheets are bonded by swaging. The at least one swaged portion is disposed in a core back portion, which is in contact with core back portions of divided cores located on both sides of the divided core, at a position whose distance from an outer periphery of the core back portion is within ⅓ of a radial length of the core back portion.

The rotating electrical machine disclosed in the present application can obtain the stator of the rotating electrical machine to achieve both a reduction in iron loss and a high rigidity of the divided cores by providing the swaged portions at positions which do not affect the magnetic flux of a permanent magnet.

The foregoing and other objects, features, and advantageous effects of the present disclosure will become more apparent from detailed description in the following embodiments and description in the accompanying drawings.

DESCRIPTION OF EMBODIMENTS

Preferred embodiments of a stator of a rotating electrical machine will now be described with reference to the drawings.

First Embodiment

Figure 1:
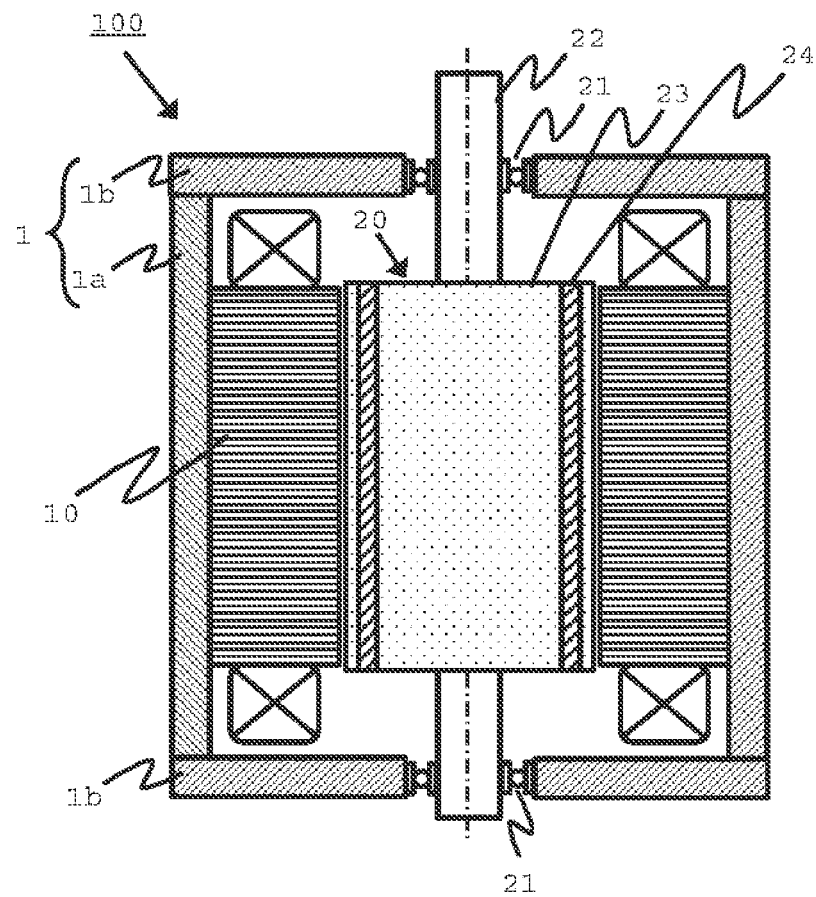
FIG. 1 is a cross-sectional view showing the overall construction of a rotating electrical machine according to the first embodiment.
Figure 2:
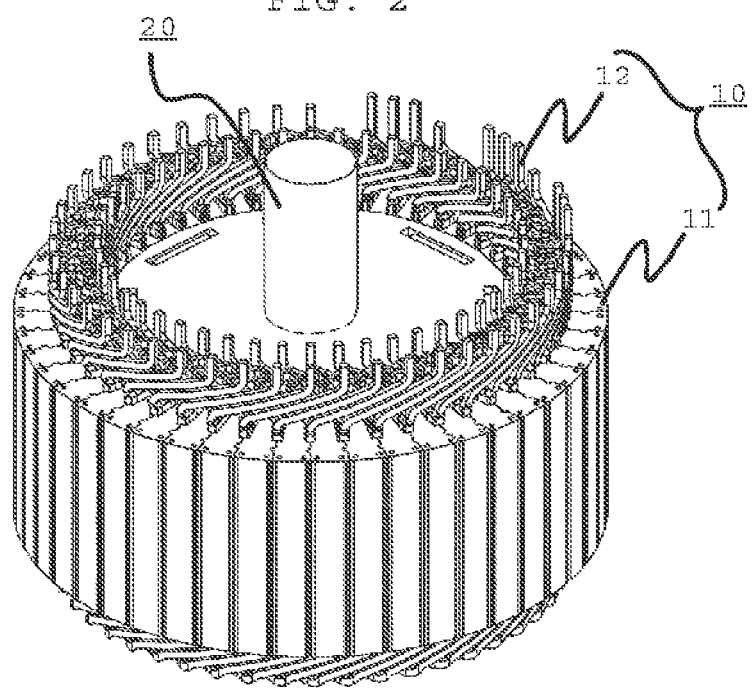
FIG. 2 is a perspective view of a main portion of the rotating electrical machine of FIG. 1.
Figure 3:
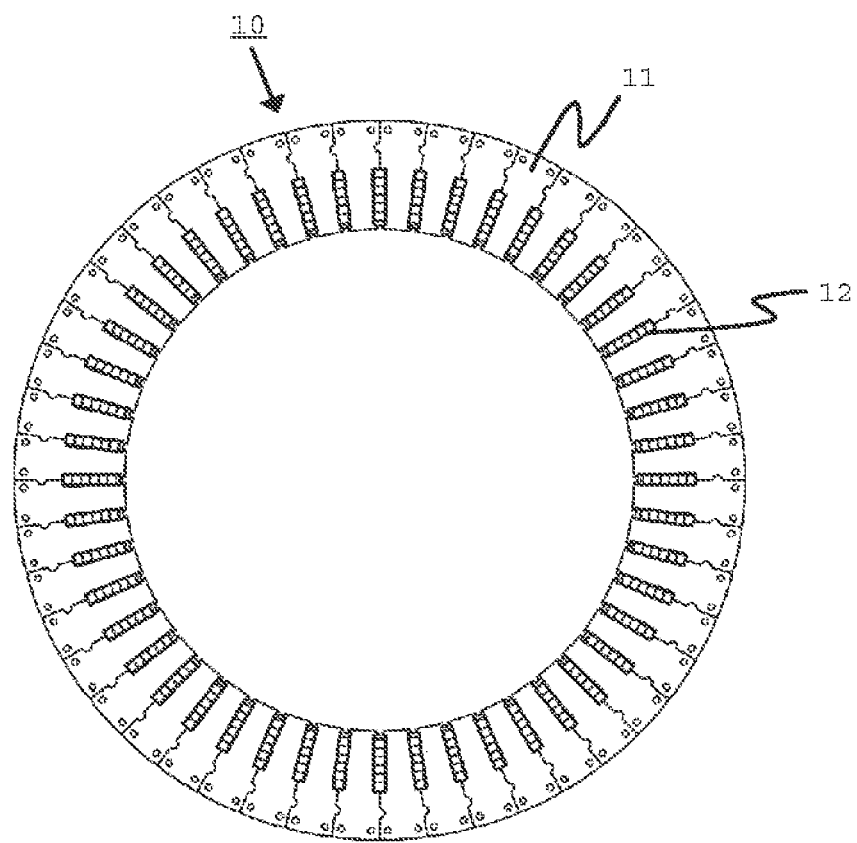
FIG. 3 is a plan view of the stator of the rotating electrical machine of FIG. 1, as viewed in the axial direction.
Figure 4:
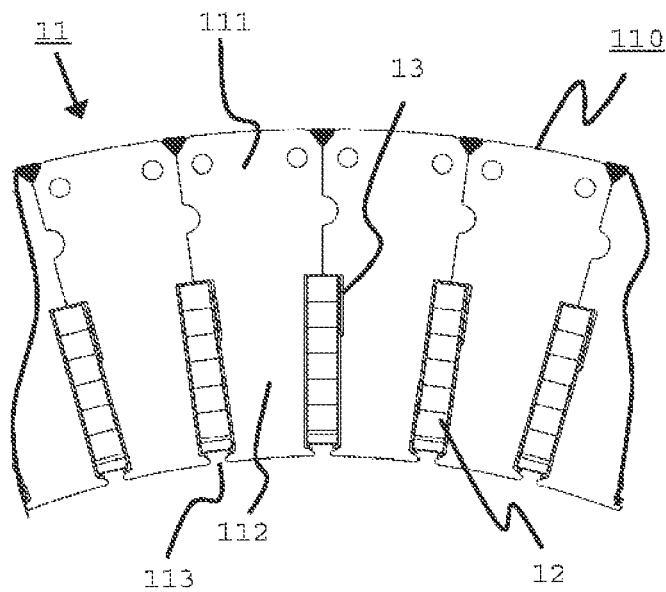
FIG. 4 is an enlarged plan view of a main portion of the stator of FIG. 3.
Figure 5:
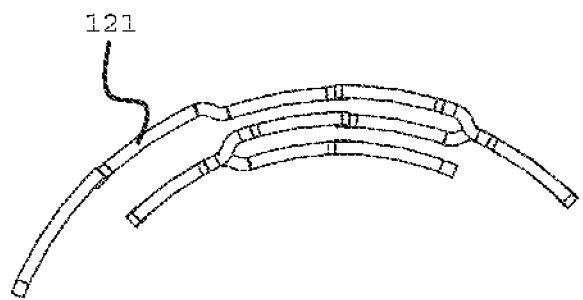
FIG. 5 is a plan view of a unit coil for use in stator winding according to the first embodiment, as viewed in the axial direction.
Figure 6:
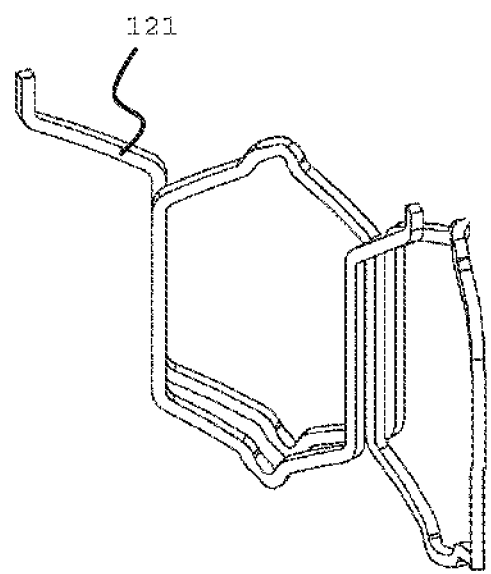
FIG. 6 is a perspective view of the unit coil of FIG. 5.
Figure 7:
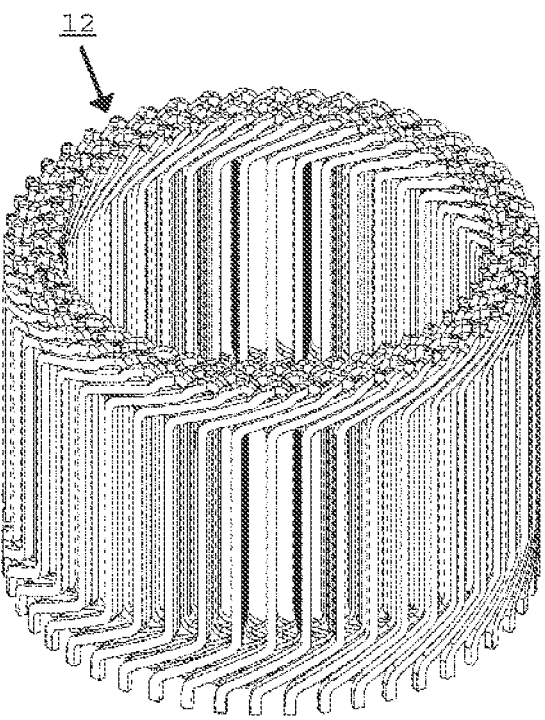
FIG. 7 is a perspective view of stator windings according to the first embodiment.
Figure 8:
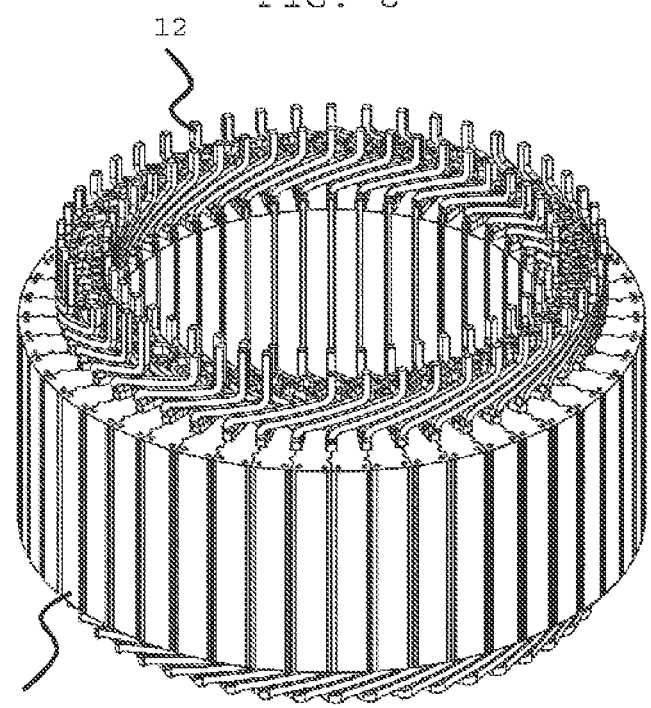
FIG. 8 is a perspective view of the stator according to the first embodiment.

FIG. 1 is a cross-sectional view showing the overall construction of a rotating electrical machine according to the first embodiment, FIG. 2 is a perspective view of a main portion of the rotating electrical machine of FIG. 1, FIG. 3 is a plan view of the stator of FIG. 1, as viewed in the axial direction, and FIG. 4 is an enlarged plan view of a main portion of the stator of FIG. 3. FIG. 5 is a plan view of a unit coil for use in stator winding according to the first embodiment, as viewed in the axial direction, FIG. 6 is a perspective view of the unit coil of FIG. 5, FIG. 7 is a perspective view of stator windings, and FIG. 8 is a perspective view of the stator according to the first embodiment.

Referring to FIG. 1, the rotating electrical machine 100 includes a housing 1, having a cylindrical frame 1a and upper and lower brackets 1b that close the upper and lower openings of the frame 1a, a stator 10 fixed in the cylindrical frame 1a, and a rotor 20 disposed inside and opposite the stator 10.

The rotor 20 includes a rotating shaft 22 which is rotatably supported by the upper and lower brackets 1b via bearings 21, a rotor core 23 secured to the rotating shaft 22, and permanent magnets 24 housed in holes which penetrate through the rotor core 23 in the axial direction and which are located near the peripheral surface of the rotor core 23. The permanent magnets 24 are arranged at a regular pitch in the circumferential direction, and constitute magnet poles. Thus, the rotor 20 is a so-called permanent magnet-type rotor.

The rotor 20, however, is not limited to a permanent magnet-type rotor. Further, it is possible to use, as the rotor 20, a squirrel-cage rotor in which non-insulated rotor conductors are housed in slots formed in a rotor core 23, with both ends of the rotor conductors being short-circuited by a pair of short-circuit rings, or a wound rotor in which insulated conductor wires are placed in slots formed in a rotor core 23.

The construction of the stator 10 will now be descried in detail with reference to FIGS. 2 through 11. For the sake of easier illustration, the axial direction of the rotating shaft 22 will be hereinafter referred to as the axial direction or axially, a radial direction of the rotating shaft 22 as a radial direction or radially, and the direction of rotation on the axis of the rotating shaft 22 as the circumferential direction.

As shown in FIGS. 2 through 4, the stator 10 includes a stator core 11 mounted in the cylindrical frame 1a, and stator windings 12 mounted on the stator core 11. Insulating members 13 for insulating the stator core 11 and the stator windings 12 from each other are mounted on the stator core 11. Further, a filler, such as varnish, is impregnated in the stator core 11. In the illustrated embodiment, the number of poles of the rotor is 8, the number of slots of the stator core 11 is 48, and the stator windings 12 are three-phase windings. Thus, the slots are formed in the stator core 11 at a rate of 2 per pole per phase.

The stator core 11 is formed by assembling divided cores 110. Each divided core 110 has a core back portion 111 having an arc-shaped outer periphery, and a teeth portion 112 extending radially inward from the core back portion 111. In the stator core 11, the divided cores 110 are arranged in a ring, with the circumferentially adjacent side surfaces of the core back portions 111 of adjacent divided cores 110 being in contact with each other. The space between two circumferentially adjacent teeth portions 112 forms a slot 113.

On the other hand, the stator windings 12 include a plurality of unit coils 121. The unit coil 121 includes a continuous conductor wire, such as a copper wire or an aluminum wire, having an insulating coating, having no connecting portion and having a rectangular cross section, as shown in FIG. 5. As shown in FIG. 6, the unit coil 121 is wound in a coil pattern of a 90 degree-rotated figure-8 shape when viewed in a radially outward direction. The unit coil 121 having such a structure is a distributed lap winding.

A conductor wire having a circular cross section may be used instead of the conductor wire having a rectangular cross section. 6-slot interval is the interval between slots 113 located on both sides of 6 circumferentially consecutive teeth portions 112, and corresponds to one magnetic-pole pitch in the illustrated embodiment.

When assembling the stator 10, 48 unit coils 121 are first arranged at a 1-slot pitch in the circumferential direction to assemble annular stator windings 12 in an unconnected state as shown in FIG. 7. In particular, 48 groups of unconnected stator windings 12, each group having first, second, third, fourth, fifth and sixth slot insertion portions arranged in a line in a radial direction, are arranged at a 1-slot pitch in the circumferential direction.

Next, 48 divided cores 110 are arranged in a ring around the outer periphery of the assembled stator windings 12, and the divided cores 110 are then moved radially inward, whereby the teeth portion 112 of each divided core 110 is inserted between two circumferentially adjacent groups, each having the first to sixth slot insertion portions. The circumferentially adjacent side surfaces of the core back portions 111 of adjacent divided cores 110 come into contact with each other, when the radially inward movement of the divided cores 110 ceases.

The stator windings 12 are mounted on the stator core 11 by the above process, as shown in FIG. 8. Finally, a first terminal and a second terminal of one unit coil 121 are bonded, e.g. by welding, to a first terminal and a second terminal of another unit coil 121, thereby completing the assembly of the stator 10.

The stator core 11, the main portion of the rotating electrical machine according to the first embodiment, will now be described with reference to FIGS. 9A through 9C and FIG. 10.

Figure 9A:
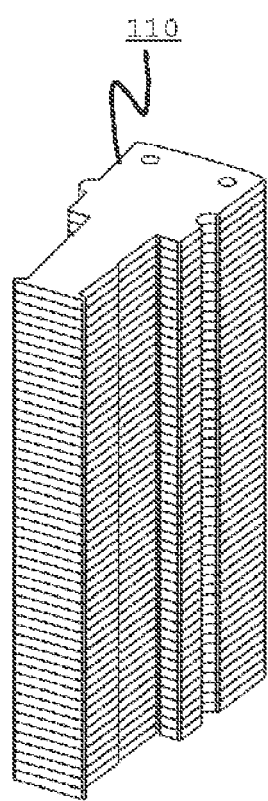
FIG. 9A is a perspective view of a divided core of the stator according to the first embodiment.
Figure 9B:
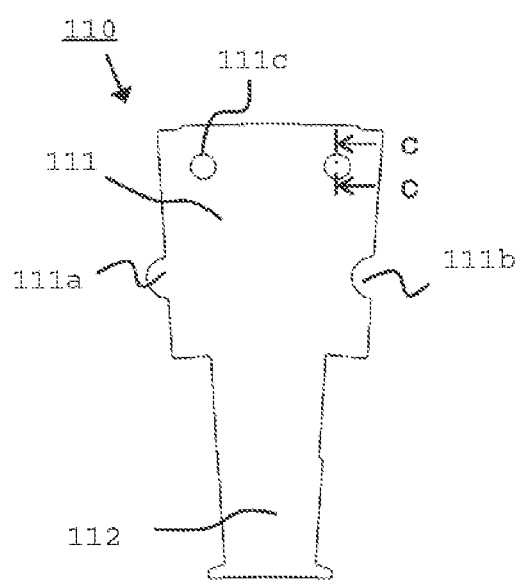
FIG. 9B is a plan view of the divided core of FIG. 9A.
Figure 9C:
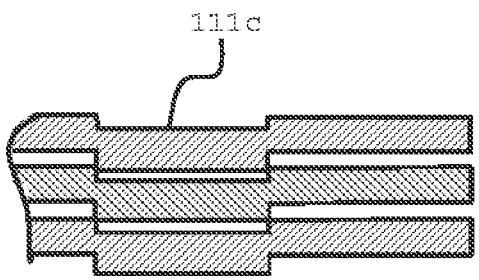
FIG. 9C is a cross-sectional view of a main portion of the divided core of FIG. 9B.

FIG. 9A is a perspective view of a divided core constituting the stator core 11 according to the first embodiment, FIG. 9B is a plan view of the divided core of FIG. 9A, and FIG. 9C is a cross-sectional view taken along the line C-C of FIG. 9B.

Referring to the Figures, the divided core 110, constituting the stator core 11, includes a laminate of magnetic steel sheets. Each magnetic steel sheet has a core back portion 111 having an arc-shaped outer periphery, and a tooth portion 112 extending radially inward from the core back portion 111. A convex portion 111a is provided on one side surface of the core back portion 111 at a radially middle position, while a concave portion 111b is provided in the other side surface of the core back portion 111 at a radially middle position. A pair of swaged portions 111c are provided in the core back portion 111 at positions near the outer periphery. The laminated magnetic steel sheets are integrally bonded together by the swaged portions 111c. The annular stator core 11 is formed by fitting the convex portion 111a of each core back portion 111 in the concave portion 111b of the adjacent core back portion 111.

Figure 19:
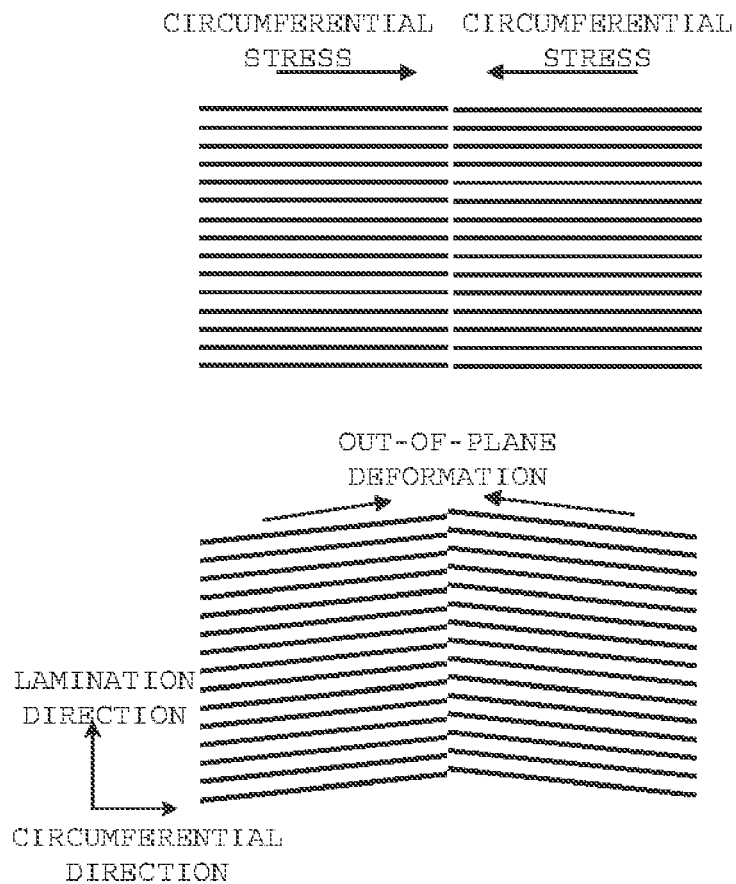
FIG. 19 is a schematic view illustrating out-of-plane deformation of a stator.

When the outer periphery of the laminated magnetic steel sheets is fixed by the frame 1a, a circumferential load acts on the contact surfaces between adjacent divided cores 110 as shown in FIG. 19. When the fastening strength of the magnetic steel sheets is low, a magnetic steel sheet(s) may slide in the circumferential direction, causing out-of-plane deformation, deflection or buckling of the stator core 11.

Figure 10:
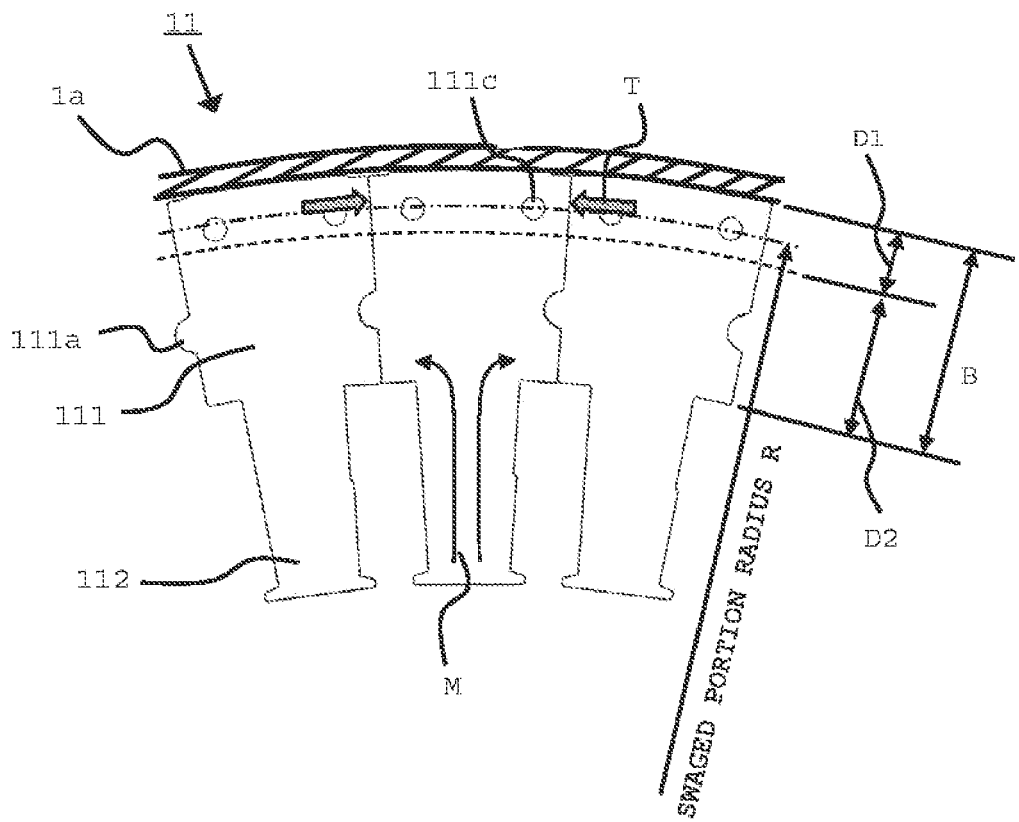
FIG. 10 is a schematic view illustrating the properties of the divided core.

In view of this, as shown in FIG. 10, the swaged portions 111c are provided in this embodiment in each core back portion 111 in an area corresponding to an outer-side width D1, which is not more than ⅓ of a radial length B, of the radial width B of the core back portion 111. This can prevent out-of-plane deformation of the stator core 11. The area in which the swaged portions 111c are provided lies outside a region through which the magnetic flux of a permanent magnet passes. This can reduce the influence of the swaged portions 111c on the interlinkage magnetic flux M.

Second Embodiment

Figure 11:
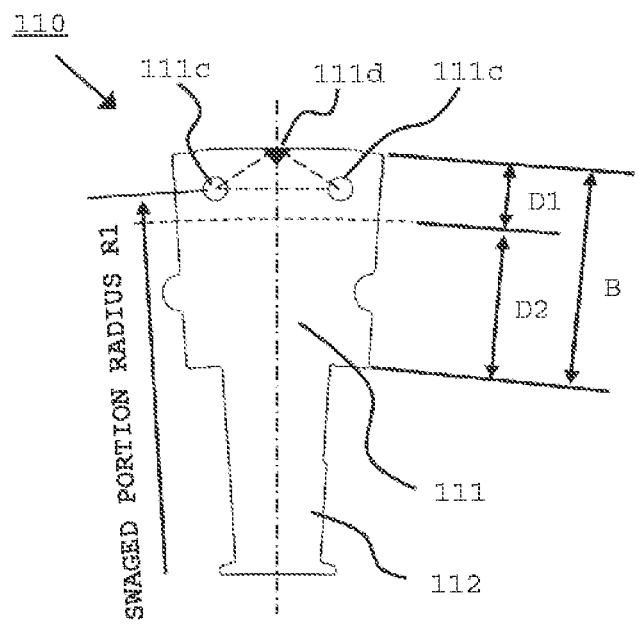
FIG. 11 is a plan view of a divided core of a stator according to the second embodiment.

FIG. 11 is a plan view of a divided core of a stator according to the second embodiment.

Referring to FIG. 11, a fastened portion 111d is formed in the core back portion 111 of the divided core 110 at a circumferentially middle, radially outermost position. The fastened portion 111d is formed by laser welding or TIG welding of magnetic steel sheets in a direction in which the magnetic steel sheets are laminated. The position of the fastened portion 111d corresponds to the vertex of an isosceles triangle whose base coincides with the line segment connecting the pair of swaged portions 111c.

The other construction of the stator of this embodiment is the same as that of the first embodiment, and therefore a duplicate description thereof will be omitted. Likewise, the construction of each of the below-described Embodiments is the same as that of the first embodiment except for the respective divided core as a main portion, and therefore a duplicate description thereof will be omitted.

By thus providing the fastened portion 111d in the core back portion 111 of each divided core 110 at the radially outermost position which makes the above-described triangle with the swaged portions 111c, the rigidity of the stator core 11 can be significantly enhanced without increasing the number of swaged portions, thereby preventing out-of-plane deformation, vibration and noise.

Third Embodiment

Figure 12:
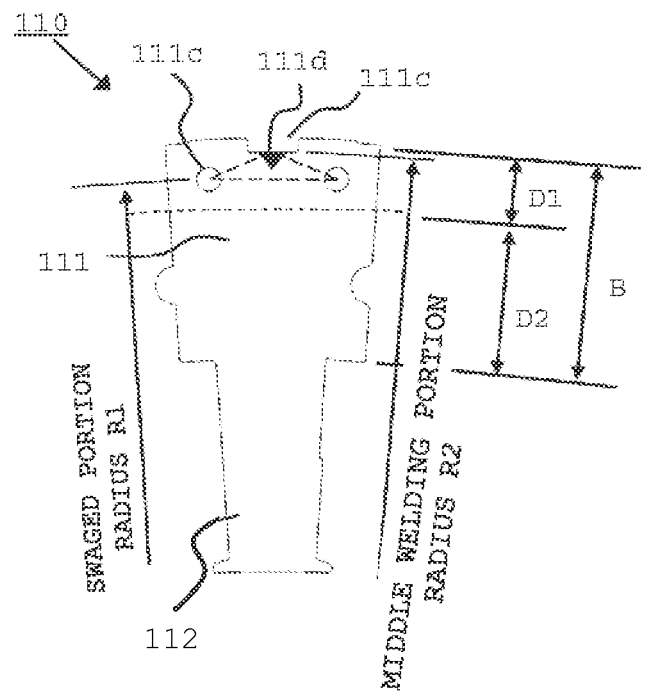
FIG. 12 is a plan view showing the construction of a divided core according to the third embodiment.

FIG. 12 is a plan view of a divided core of a stator according to the third embodiment.

Referring to FIG. 12, a recess 111e is provided in the core back portion 111 of the divided core 110 at a circumferentially middle, radially outermost position. A fastened portion 111d, which is formed by welding of magnetic steel sheets in the direction in which the magnetic steel sheets are laminated, is provided in the recess 111e. The radius R2 to the bottom of the recess 111e is made larger than the radius R1 to the swaged portions 111c so that the pair of swaged portions 111c and the fastened portion 111d make a triangle.

The same effect as the second embodiment can be obtained by thus providing the recess 111e in the radially outermost portion of the core back portion 111 of each divided core 110, and welding the laminated magnetic steel sheets in the recess 111e. Further, the recess 111e can be used for positioning of the divided core 110 and as a holding portion upon transportation. The provision of the recess 111e can therefore increase the productivity.

Fourth Embodiment

Figure 13:
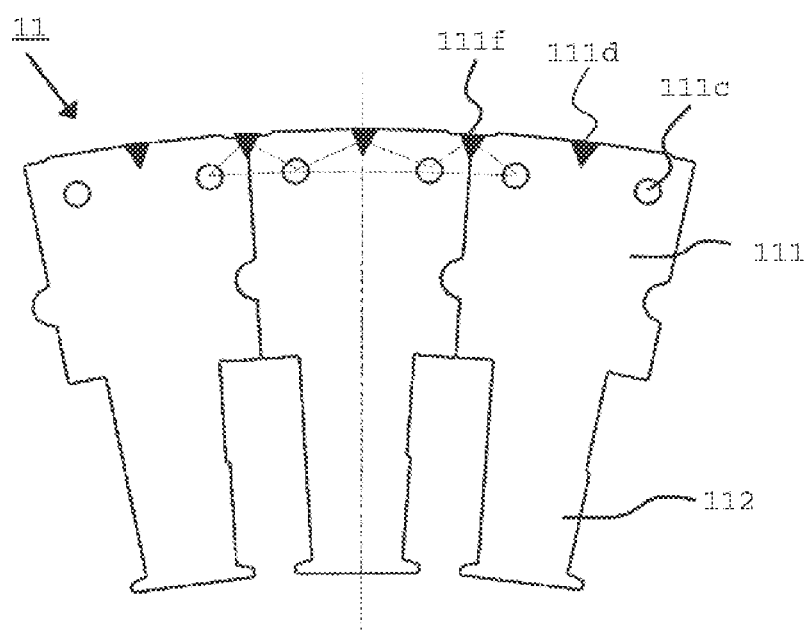
FIG. 13 is a plan view of divided cores of a stator according to the fourth embodiment.

FIG. 13 is a plan view of divided cores of a stator according to the fourth embodiment.

In the divided cores 110 of the fourth embodiment, in addition to the fastened portions 111d each of which is formed by welding in a circumferentially middle, radially outermost portion of the core back portion 111, fastened portions 111f are formed each between the adjacent radially outermost portions of adjacent divided cores 110. The fastened portions 111f are formed by welding of laminated magnetic steel sheets. The swaged portions 111c, the fastened portions 111d each located in the circumferentially middle, radially outermost portion of the core back portion 111, and the fastened portions 111f each located between the adjacent divided cores 110, are disposed such that the pair of swaged portions 111c and the fastened portion 111d of each divided core 110 make a triangle, and the adjacent swaged portions 111c of two adjacent divided cores 110 and the fastened portion 111f between the two adjacent divided cores 110 make a triangle.

By providing the fastened portions 111f, each located between the adjacent divided cores 110, in addition to the fastened portions 111d each located in the circumferentially middle, radially outermost portion of the core back portion 111, it becomes possible to increase the axial fastening strength of the magnetic steel sheets, thereby preventing out-of-plane deformation, vibration and noise.

Fifth Embodiment

Figure 14:
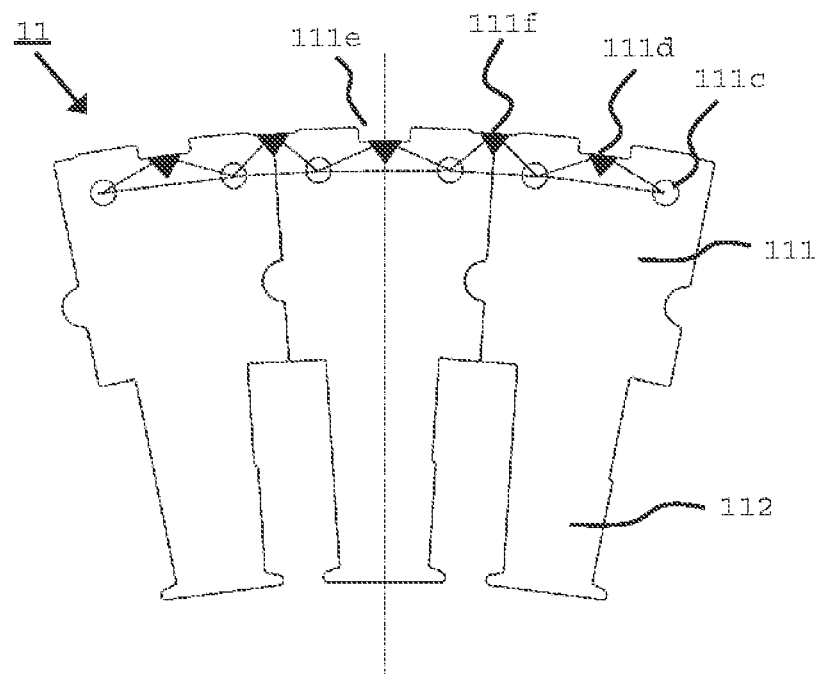
FIG. 14 is a plan view of divided cores of a stator according to the fifth embodiment.

FIG. 14 is a plan view of divided cores of a stator according to the fifth embodiment.

In the divided cores 110 of the fifth embodiment, a recess 111e is provided in each core back portion 111 at a circumferentially middle, radially outermost position, and the fastened portion 111d, which is formed by welding of magnetic steel sheets, is provided in the recess 111e. The other construction of this embodiment is the same as that of the fourth embodiment.

By welding the divided cores 110 in which the laminated magnetic steel sheets are fastened by welding in the recesses 111e at the circumferentially middle, radially outermost position of the core back portion 111, it becomes possible to increase the fastening strength of the magnetic steel sheets, thereby preventing out-of-plane deformation, vibration and noise. Further, the recesses 111e can be used for positioning of the divided cores 110 and as holding portions upon transportation. The provision of the recesses 111e can therefore increase the productivity.

Sixth Embodiment

Figure 15:
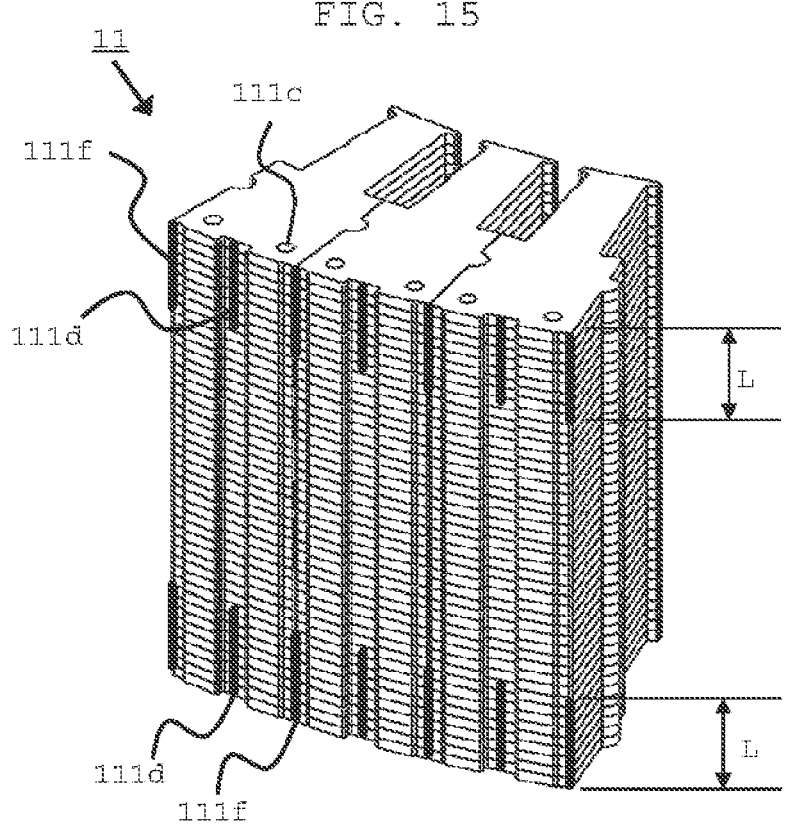
FIG. 15 is a perspective view showing the construction of a part of a stator core according to the sixth embodiment.

FIG. 15 is a perspective view showing the construction of a part of a stator core according to the sixth embodiment.

In the sixth embodiment, laminated magnetic steel sheets are welded only at both axial ends (see L, L in FIG. 15) of each divided core 110, and welding of the axially intermediate portion is omitted.

By thus welding and fixing only the axial ends of each divided core 110, peeling is less likely to occur at the core ends, leading to the effect of preventing out-of-plane deformation. Further, the decrease in the welding length can reduce the facility cost and increase the productivity and, in addition, can reduce the increase in iron loss due to welding.

Seventh Embodiment

Figure 16:
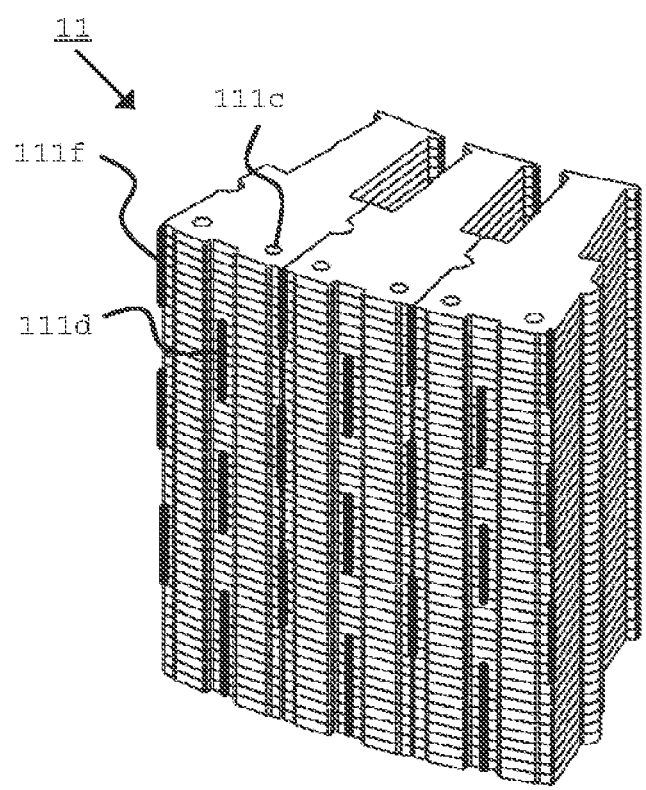
FIG. 16 is a perspective view showing the construction of a part of a stator core according to the seventh embodiment.

FIG. 16 is a perspective view showing the construction of a part of a stator core according to the seventh embodiment.

As shown in FIG. 16, in the divided cores 110 of the seventh embodiment, the fastened portions 111f, which are formed between the divided cores by welding of laminated magnetic steel sheets, and the fastened portions 111d which are formed in the recesses 111e by welding of laminated magnetic steel sheets, are disposed in a zigzag pattern in the axial direction.

By thus arranging the fastened portions 111d, 111f, which are formed by welding of laminated magnetic steel sheets in the lamination direction, in a zigzag pattern, it becomes possible to obtain the effect of reducing the increase in iron loss due to welding loss.

Eighth Embodiment

Figure 17A:
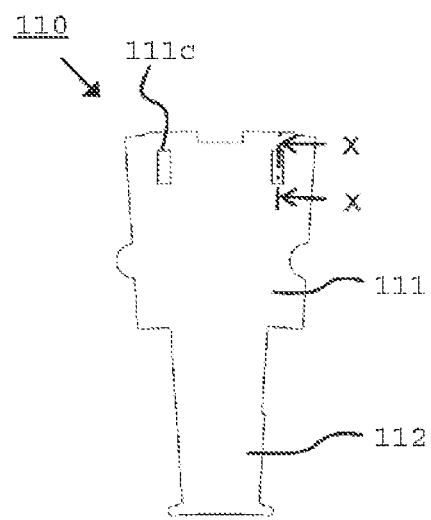
FIG. 17A is a plan view of a divided core according to the eighth embodiment.
Figure 17B:
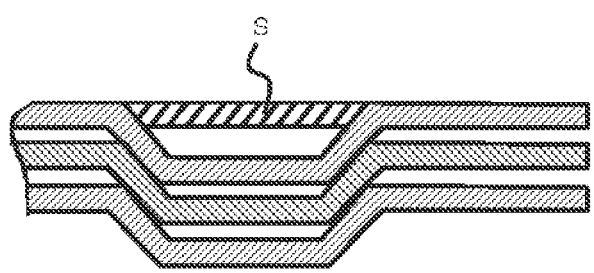
FIG. 17B is a cross-sectional view of a main portion of the divided core of FIG. 17A.

FIG. 17A is a plan view of a divided core according to the eighth embodiment, and FIG. 17B is a cross-sectional view of a main portion of the divided core.

In the divided core 110 of the eighth embodiment, at least two laminated magnetic steel sheets are fastened by a swaged portion 111c which has a shear plane S as shown in FIG. 17B.

The formation of the shear plane S in the swaged portion 111c of magnetic steel sheets can increase the swaging strength and enhance the core rigidity, thereby achieving the effect of preventing out-of-plane deformation.

Ninth Embodiment

Figure 18:
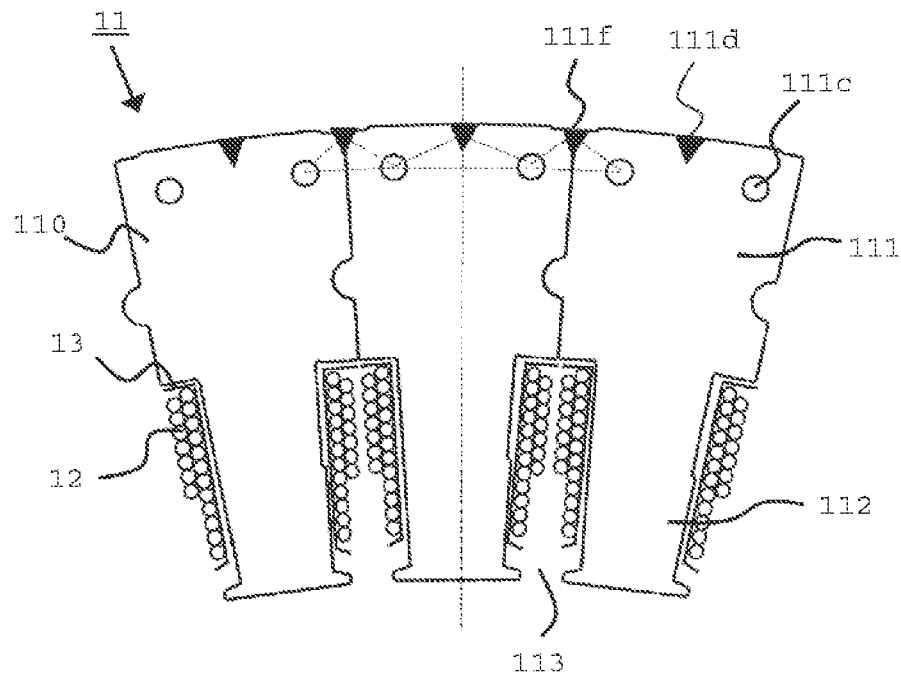
FIG. 18 is a cross-sectional view of a main portion of a stator according to the ninth embodiment.

FIG. 18 is a cross-sectional view of a main portion of a stator according to the ninth embodiment.

The stator 10 of the ninth embodiment has a concentrated winding structure in which a coil is wound directly on the teeth portion of each of the circumferentially divided cores. In the stator core 11 including laminated magnetic steel sheets, a stator winding 12 is wound on each teeth portion 112 via an insulating member 13 made of insulating paper. A filler is impregnated in part of the slots 113 in which the stator windings 12 are housed.

The use of such a concentrated winding structure can increase the productivity. Further, by impregnating the filler in the slots 13, the filler fills the interspace between a core side surface and insulating paper and the interspace between insulating paper and the winding, whereby magnetic steel sheets are bonded together. This increases the fastening strength in the direction in which the magnetic steel sheets are laminated, and therefore can enhance the rigidity of the stator core in the radial direction and can prevent out-of-plane deformation, vibration and noise.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments.

It is therefore understood that numerous modifications which have not been exemplified can be devised without departing from the scope of the present application. For example at least one of the constituent components may be modified, added, or eliminated. At least one of the constituent components mentioned in at least one of the preferred embodiments may be selected and combined with the constituent components mentioned in another preferred embodiment.

What is claimed is:

1. A rotating electrical machine comprising:
   a housing;
   a stator fixed in the housing; and
   a rotor disposed inside and opposite the stator,
   wherein the stator includes a stator core having radially divided cores arranged in a ring, each divided core being a laminate of magnetic steel sheets, and stator windings placed in slots each formed by two adjacent ones of the divided cores of the stator core, and
   wherein each divided core has at least one swaged portion in which the laminated magnetic steel sheets are bonded by swaging, the at least one swaged portion being disposed in a core back portion that is in contact with core back portions of divided cores located on both sides of the divided core, wherein the at least one swaged portion is positioned a distance from an outer periphery of the core back portion is that is less than ⅓ of a radial length of the core back portion,
   wherein the at least one swaged portion includes two swaged portions, wherein each divided core has a fastened portion formed by welding of the laminated magnetic steel sheets, in a circumferentially middle, radially outermost portion of the core back portion, and wherein the fastened portion and the two swaged portions are disposed in a triangle.

2. The rotating electrical machine according to claim 1, wherein a recess is provided in the circumferentially middle, radially outermost portion of the core back portion, and the fastened portion is formed in the recess.

3. The rotating electrical machine according to claim 1, wherein the stator core has fastened portions formed by welding of adjacent divided cores.

4. The rotating electrical machine according to claim 2, wherein the stator core has fastened portions formed by welding of adjacent divided cores.

5. The rotating electrical machine according to claim 3, wherein each fastened portion formed by welding of the two adjacent divided cores and the adjacent swaged portions of the two adjacent divided cores are disposed in a triangle.

6. The rotating electrical machine according to claim 4, wherein each fastened portion formed by welding of the two adjacent divided cores and the adjacent swaged portions of the two adjacent divided cores are disposed in a triangle.

7. The rotating electrical machine according to claim 1, wherein the welding-fastened portions are disposed only at both axial ends of the stator core.

8. The rotating electrical machine according to claim 2, wherein the welding-fastened portions are disposed only at both axial ends of the stator core.

9. The rotating electrical machine according to claim 3, wherein the welding-fastened portions are disposed only at both axial ends of the stator core.

10. The rotating electrical machine according to claim 4, wherein the welding-fastened portions are disposed only at both axial ends of the stator core.

11. The rotating electrical machine according to claim 5, wherein the welding-fastened portions are disposed only at both axial ends of the stator core.

12. The rotating electrical machine according to claim 6, wherein the welding-fastened portions are disposed only at both axial ends of the stator core.

13. The rotating electrical machine according to claim 1, wherein the welding-fastened portions are disposed in the stator core in a zigzag pattern in an axial direction.

14. The rotating electrical machine according to claim 1, wherein each swaged portion of the laminated magnetic steel sheets has two or more shear planes.

15. The rotating electrical machine according to claim 1, wherein each swaged portion of the laminated magnetic steel sheets has two or more shear planes.

16. The rotating electrical machine according to claim 1, wherein a filler is impregnated in the slots.

17. The rotating electrical machine according to claim 1, wherein a filler is impregnated in the slots.

18. The rotating electrical machine according to claim 13, wherein a filler is impregnated in the slots.

* * * * *